United States Patent
Malladi et al.

(10) Patent No.: US 7,352,722 B2
(45) Date of Patent: Apr. 1, 2008

(54) MITIGATION OF LINK IMBALANCE IN A WIRELESS COMMUNICATION SYSTEM

(75) Inventors: Durga P. Malladi, San Diego, CA (US); Alkinoos Hector Vayanos, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 887 days.

(21) Appl. No.: 10/145,430

(22) Filed: May 13, 2002

(65) Prior Publication Data

US 2003/0210668 A1  Nov. 13, 2003

(51) Int. Cl.
*H04B 7/216* (2006.01)
*H04B 7/00* (2006.01)
*H04Q 7/20* (2006.01)

(52) U.S. Cl. .............. 370/335; 370/329; 455/450; 455/522

(58) Field of Classification Search ............ 370/209, 370/216, 278, 310–350, 477, 203; 455/67.13, 455/450, 132, 522, 437, 423, 516; 714/145, 714/430; 375/295
See application file for complete search history.

(56) References Cited

U.S. PATENT DOCUMENTS

| | | | | |
|---|---|---|---|---|
| 5,267,261 | A * | 11/1993 | Blakeney et al. | 370/332 |
| 5,898,682 | A * | 4/1999 | Kanai | 370/331 |
| 6,049,902 | A | 4/2000 | Davis et al. | |
| 6,332,006 | B1 | 12/2001 | Rydbeck et al. | |
| 6,496,543 | B1 * | 12/2002 | Zehavi | 375/295 |
| 6,574,211 | B2 * | 6/2003 | Padovani et al. | 370/347 |
| 6,850,499 | B2 * | 2/2005 | Wheatley et al. | 370/328 |
| 2001/0040918 | A1 | 11/2001 | Krinsky et al. | |
| 2002/0114288 | A1 * | 8/2002 | Soliman | 370/310 |
| 2003/0039226 | A1 * | 2/2003 | Kwak | 370/329 |
| 2003/0072294 | A1 * | 4/2003 | Wei et al. | 370/345 |

* cited by examiner

*Primary Examiner*—Afsar Qureshi
(74) *Attorney, Agent, or Firm*—Kent D. Baker; Rupit Patel; Thomas R. Rouse

(57) ABSTRACT

Techniques to mitigate the effects of link imbalance for the uplink between a terminal (or UE) and multiple base stations (or Node Bs). In one aspect, the serving base station (i.e., the one designated to transmit packet data to the terminal) monitors the uplink received SNR for each terminal designated to receive packet data transmission. The serving base station then determines, based on the uplink received SNR and an SNR threshold, whether or not link imbalance potentially exists for each such terminal. In another aspect, if it is determined that link imbalance potentially exists, then a 3-way handshake is performed to check the reliability of a feedback mechanism used for packet data transmission. Appropriate responsive actions may then be performed based on the result of the check.

36 Claims, 10 Drawing Sheets

MITIGATION OF LINK IMBALANCE IN A WIRELESS COMMUNICATION SYSTEM

BACKGROUND

1. Field

The present invention relates generally to data communication, and more specifically to techniques for mitigating deleterious effects due to link imbalance in a wireless communication system (e.g., a CDMA system).

2. Background

Wireless communication systems are widely deployed to provide various services such as voice, packet data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other types of system, including increased system capacity.

To improve reliability, a terminal may concurrently communicate with multiple base stations via a process often referred to as soft handover. Soft handover is typically supported for certain services (e.g., voice), but is often not supported for packet data on the downlink. This is because additional transmit power would be required to support soft handover on the downlink. Moreover, packet data service can tolerate longer delays, which then allows for implementation of a retransmission scheme. For packet data transmission on the downlink, one of the base stations with which the terminal is in communication may be designated as a "serving" base station, and only this base station transmits packet data to the terminal. Data packets received in error by the terminal (i.e., erased packets) may be identified via feedback information sent to the base station, which can then retransmit these erased packets.

To maximize system capacity, on the uplink in a CDMA system, the transmit power of each terminal is controlled by a power control loop such that the signal-to-noise-and-interference ratio (SNR) of an uplink transmission, as received at the base station, is maintained at a target SNR. This target SNR is often referred to as the setpoint. While in soft handover, the uplink transmit power of each terminal is typically adjusted based on an "OR-of-the-Down" rule whereby the terminal decreases its transmit power if any base station requests a decrease.

In certain instances, the base station with the best uplink for the terminal is not the serving base station. This phenomenon, which is referred to as link imbalance, may have a detrimental impact on the performance of packet data transmission. In particular, if link imbalance exists, then the uplink transmit power of the terminal would be adjusted based on the received SNR at the base station with the best uplink. However, this base station is not the one transmitting packet data to the terminal and receiving feedback information from the terminal. If the link imbalance is sufficiently great, then the serving base station may not reliably receive the feedback information from the terminal for erased packets. Performance may then be severely impacted by the failure to retransmit these erased packets.

There is therefore a need in the art for techniques to mitigate deleterious effects due to link imbalance in a wireless communication system.

SUMMARY

Techniques are provided herein to mitigate the effects of link imbalance for the uplink between a terminal (or UE) and multiple base stations (or Node Bs). In one aspect, the serving base station (i.e., the one designated to transmit packet data to the terminal) monitors the uplink received SNR for each terminal designated to receive packet data transmission. The serving base station then determines, based on the uplink received SNR and an SNR threshold, whether or not link imbalance potentially exists for each such terminal. In another aspect, if it is determined that link imbalance potentially exists, then a 3-way handshake is performed to check the reliability of a feedback mechanism used for packet data transmission. Appropriate responsive actions may then be performed based on the result of the check.

In an embodiment, a method is provided for checking the reliability of the uplink in a CDMA communication system. In accordance with the method, whether or not link imbalance potentially exists for the uplink between a particular terminal and a number of base stations is initially determined. Link imbalance is characterized by the uplink being worse from the terminal to the serving base station than to another base station. Link imbalance may be determined by comparing the uplink SNR received at the serving base station for the terminal against an SNR threshold, and indicating that link imbalance potentially exists if the uplink received SNR is lower than the SNR threshold.

If link imbalance is determined to potentially exist, then a transmission is sent on the downlink having included therein data related to feedback information previously received via the uplink. The feedback information may comprise an acknowledgment (ACK), a negative acknowledgment (NAK), or a discontinuous transmission (DTX) bit for a previous data packet transmitted on the downlink. In this case, the transmission on the downlink may include a bit set to a value which is determined based on whether an ACK, NAK, or DTX was received for the feedback information.

Various aspects and embodiments of the invention are described in further detail below. The invention further provides methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
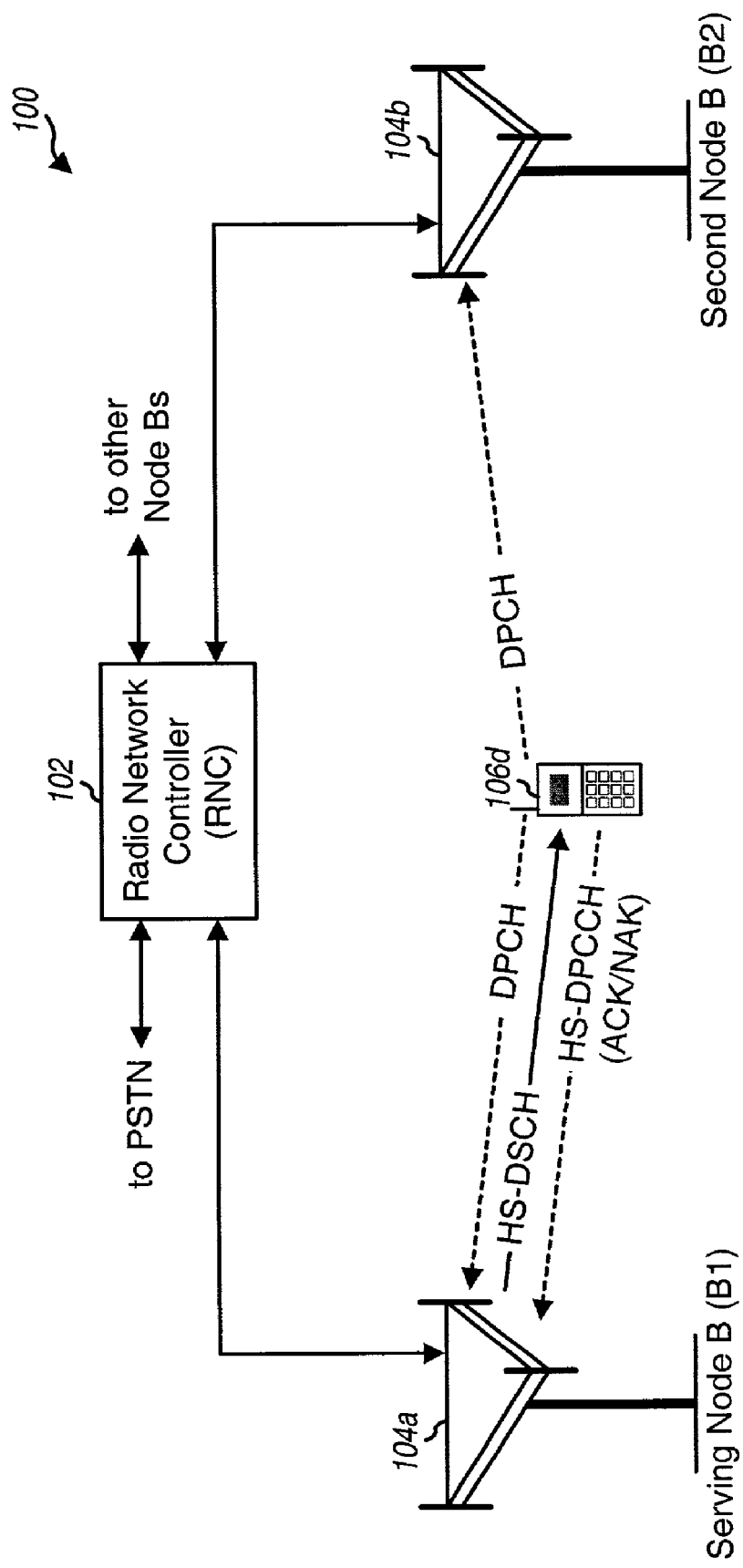
FIG. 1 is a diagram of a wireless communication system.

FIG. 1 is a diagram of a wireless communication system 100 that may implement various aspects and embodiments of the techniques for mitigating deleterious effects of link imbalance. System 100 includes a number of base stations 104 that provide coverage for a particular geographic area. For simplicity, only two base stations are shown in FIG. 1. A base station is also referred to as a Node B, a base transceiver system (BTS), an access point, or some other terminology. A base station and/or its coverage area are also often referred to as a cell, depending on the context in which the term is used. The base stations are part of a UMTS Radio Access Network (UTRAN).

Various terminals 106 are typically dispersed throughout the system. For simplicity, only one terminal is shown in FIG. 1. A terminal is also referred to as user equipment (UE), a mobile station, an access terminal, or some other terminology. Each terminal may communicate with one or more base stations on the downlink and/or uplink at any given moment, depending on whether or not the terminal is active, whether or not soft handover is supported for the data transmission, and whether or not it is in soft handover. The downlink (i.e., forward link) refers to transmission from the base station to the terminal, and the uplink (i.e., reverse link) refers to transmission from the terminal to the base station.

A system controller 102 couples to base stations 104 and may further couple to a public switched telephone network (PSTN) and/or one or more packet data networks (PDNs). System controller 102 is also referred to as a radio network controller (RNC), a base station controller (BSC), or some other terminology. System controller 102 provides coordination and control for the base stations coupled to it. System controller 102 further controls the routing of calls (1) among terminals 106, and (2) between terminals 106 and other users coupled to the PSTN (e.g., conventional telephones) and PDNs, via base stations 104.

The techniques described herein for mitigating deleterious effects of link imbalance may be implemented in various wireless communication systems. System 100 may be a code division multiple access (CDMA), time division multiple access (TDMA), or frequency division multiple access (FDMA) communication system. As a CDMA system, system 100 may be designed to implement one or more commonly known CDMA standards such as W-CDMA, IS-95, IS-2000, IS-856, and others. For clarity, various aspects, embodiments, and implementation details for mitigating link imbalance are described below for a W-CDMA system. Using W-CDMA terminology, the base station, terminal, and system controller are respectively referred to as Node B, UE, and RNC in the following description.

In W-CDMA, data to be transmitted to a particular UE is processed as one or more transport channels at an upper layer. The transport channels are then mapped to one or more physical channels (at a physical layer) assigned to the UE. A physical channel is defined by various parameters including (1) a specific carrier frequency, (2) a specific scrambling code used to spectrally spread the data prior to transmission, (3) one or more channelization codes (if needed) used to channelize the data so that it is orthogonal to the data channelized by other codes, (4) specific start and stop times (defining a duration), and (5) on the uplinik, a relative phase (0 or π/2). These various physical channel parameters are described in detail in W-CDMA standard documents.

The following transport and physical channels defined by W-CDMA are referred to herein:

CPICH—common pilot channel
DPDCH—dedicated physical data channel
DPCCH—dedicated physical control channel
DPCH—dedicated physical channel (includes the DPDCH and DPCCH)
HS-DSCH—high-speed downlink shared channel
HS-SCCH—shared control physical channel for the HS-DSCH
HS-PDSCH—high-speed physical downlink shared channel
HS-DPCCH—high-speed dedicated physical control channel (uplink)

Release 5 of W-CDMA supports high-speed downlink packet access (HSDPA), which is a set of physical channels and procedures defined as part of the UTRAN that enable high-speed transmission of data on the downlink. Data for HSDPA is processed in transport blocks (or packets), each of which spans a time interval referred to as transmission time interval (TTI). The transport blocks are then multiplexed onto the high-speed downlink shared channel (HS-DSCH), which is a downlink transport channel that may be shared by multiple UEs. The HS-DSCH is then mapped to a high-speed physical downlink shared channel (HS-PDSCH).

The channel structure for HSDPA thus includes a single high-speed downlink physical channel (HS-PDSCH) that may be used to transmit data in a time and code division multiplexed (TDM/CDM) manner for multiple UEs. The signaling for the HS-PDSCH, which includes various parameters used to properly receive the HS-PDSCH, is transmitted on an associated HS-SCCH. The HSDPA channel structure also includes a feedback mechanism for the UEs to report correctly and incorrectly received (i.e., erased) data packets. This feedback mechanism is referred to as Hybrid ARQ (HARQ) mechanism, and it enables the Node-B to know whether or not a packet has been received correctly by the UE. If the Node-B receives a negative acknowledgment (NAK), then it retransmits the erased packet.

Each UE receiving HSDPA is also assigned a downlink DPCH and an uplink DPCH. The downlink DPCH is used to transmit user-specific data and signaling from the Node B to the UE. The uplink DPCH is used to transmit user-specific data and signaling from the UE to the Node B. Each UE receiving HSDPA also transmits feedback information on the uplink HS-PDCCH for the data transmission received on the downlink via the HS-PDSCH. HSDPA transmission and the physical channels used for HSDPA are described in further detail below.

Figure 2A:
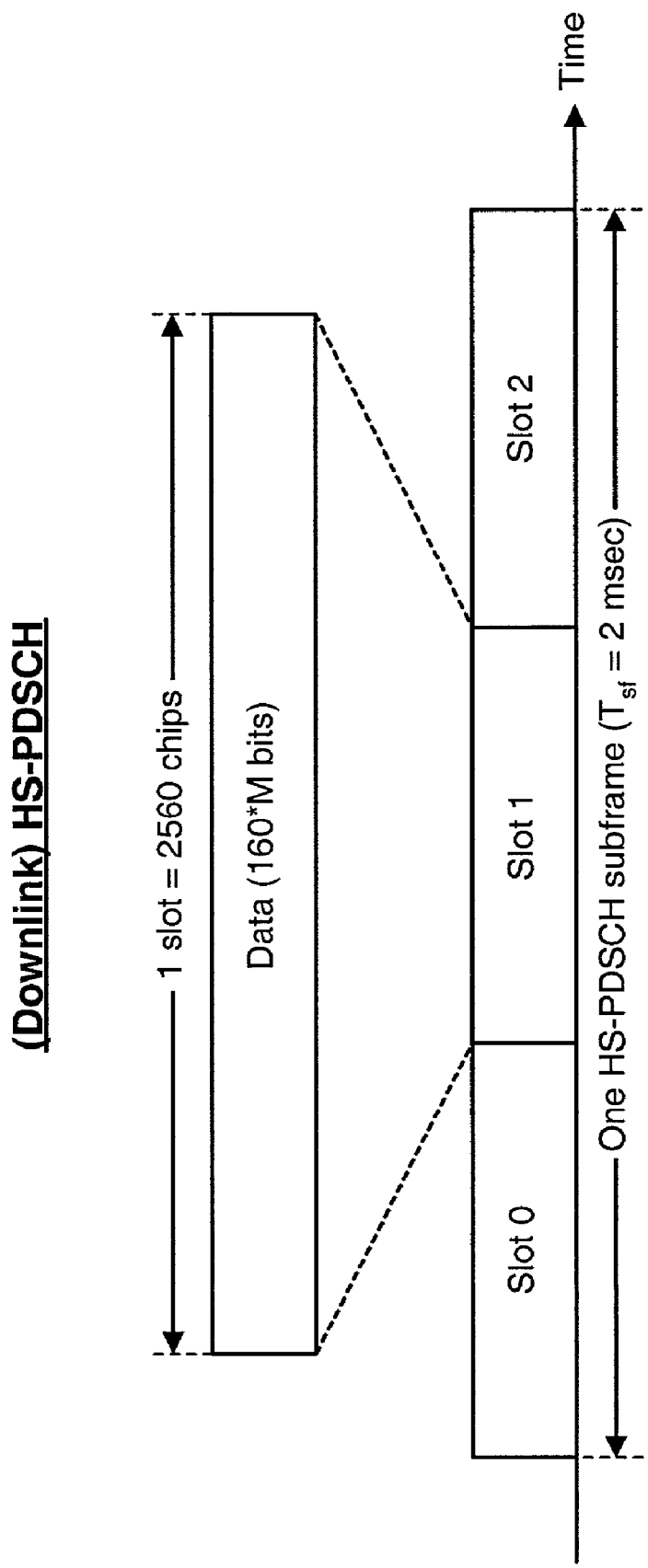
FIGS. 2A through 2D are diagrams illustrating the structure for the HS-PDSCH, HS-SCCH, uplink HS-PDCCH, and uplink HS-DPCH, as defined by W-CDMA.

FIG. 2A is a diagram illustrating a subframe structure for the HS-PDSCH as defined by W-CDMA. The HS-PDSCH is a downlink physical channel used to carry data for the HS-DSCH, which is a transport channel.

As shown in FIG. 2A, the transmission timeline for the HS-PDSCH is divided into subframes, with each subframe including three slots and having a duration of 2 msec. Each slot has a duration of 2560 chips and can carry 160·M data bits per channelization code, where M=2 for QPSK and M=4 for 16-QAM. A chip corresponds to one bit of a pseudo-random noise (PN) sequence used as the scrambling code to spectrally data prior to transmission over the air.

The HS-PDSCH is associated with one channelization code of fixed spreading factor SF=16 selected from a set of channelization codes reserved for HS-DSCH transmission. SF denotes the spreading factor (or the sequence length) of the channelization code, with shorter SFs generally corresponding to higher data rates. To increase the effective data rate, a UE may be assigned multiple channelization codes in the same HS-PDSCH subframe, if it is capable of receiving multiple channelization codes.

Figure 2B:
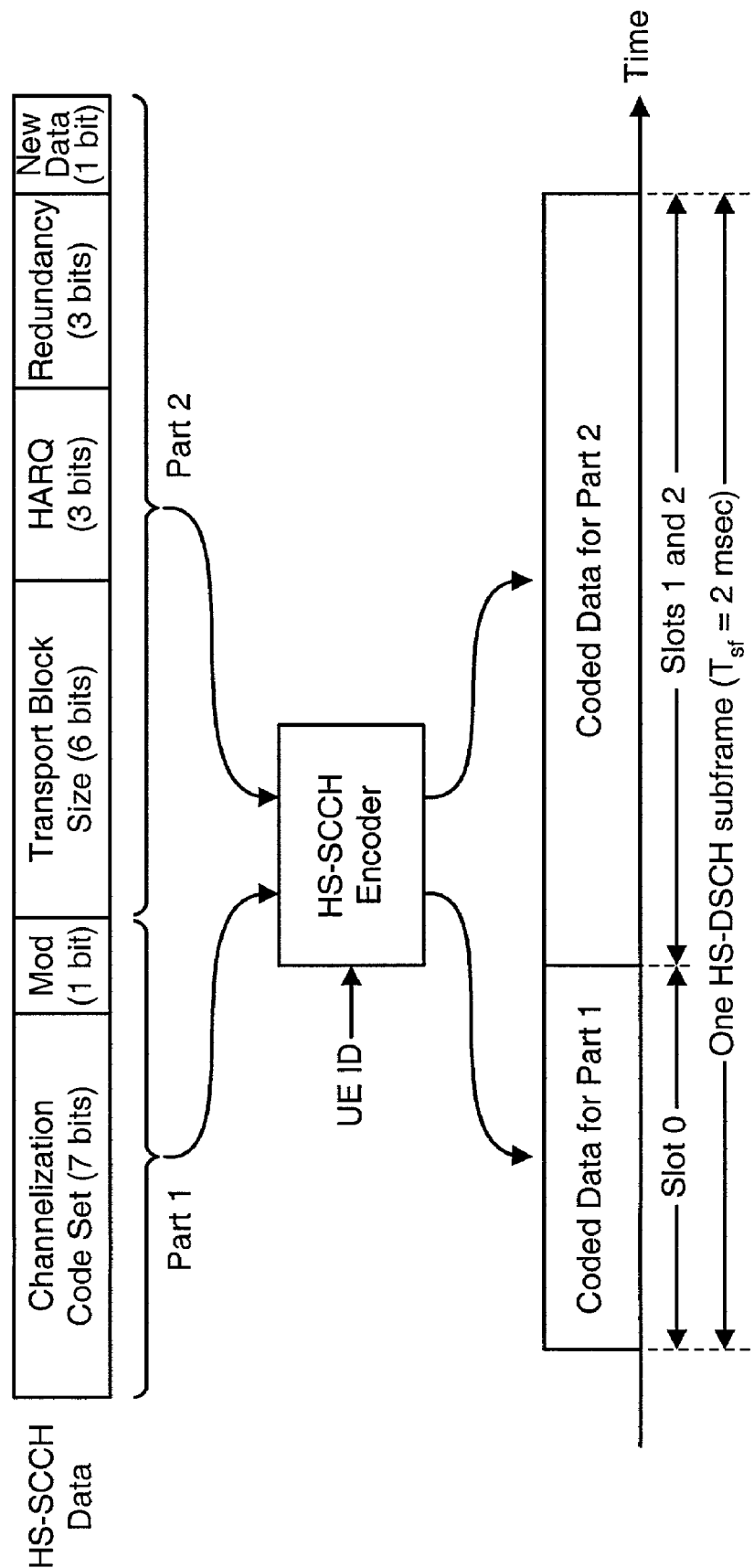

FIG. 2B is a diagram illustrating a subframe structure for the HS-SCCH as defined by W-CDMA. The HS-SCCH is a fixed rate downlink physical channel used to carry downlink signaling related to the HS-DSCH transmission. In particular, the HS-SCCH carries physical layer information needed by the UE to receive and decode the packet transmitted on the associated HS-PDSCH. This information includes the following:

Channelization code set (7 bits)—indicates the starting channelization code and the number of codes used for the HS-PDSCH.
Modulation scheme (1 bit)—indicate whether QPSK or 16-QAM is used for the HS-PDSCH.
Transport block size (6 bits)—indicates the number of data bits being transmitted in the associated subframe on the HS-DSCH.
HARQ process information (3 bits)—
Redundancy and constellation version (3 bits)—
New data indicator (1 bit)—indicates whether or not a new packet is being transmitted on the HS-PDSCH.
UE identity or UE ID (10 bits)—identifies the specific UE for which the packet on the HS-PDSCH is intended.

As shown in FIG. 2B, the transmission timeline for the HS-SCCH is also divided into subframes, with each subframe including three slots and having a duration of 2 msec. Each slot can carry 40 data bits and has a duration of 2560 chips. The channelization code set and modulation scheme (labeled as part 1) are encoded using the UE ID and sent on slot 0 of the subframe. The transport block size, HARQ process information, redundancy and constellation version, and new data indicator (labeled as part 2) are also encoded using the UE ID and sent on slots 1 and 2 of the subframe.

As shown in FIG. 2B, the HS-SCCH spans 2 msec, which is the same as the HS-DSCH. However, the HS-SCCH is transmitted 2 slots prior to the corresponding HS-DSCH. Therefore, if a subframe on the HS-DSCH spans slots n, n+1, and n+2, then the associated subframe on the corresponding HS-SCCH spans slots n−2, n−1, and n.

Figure 2C:
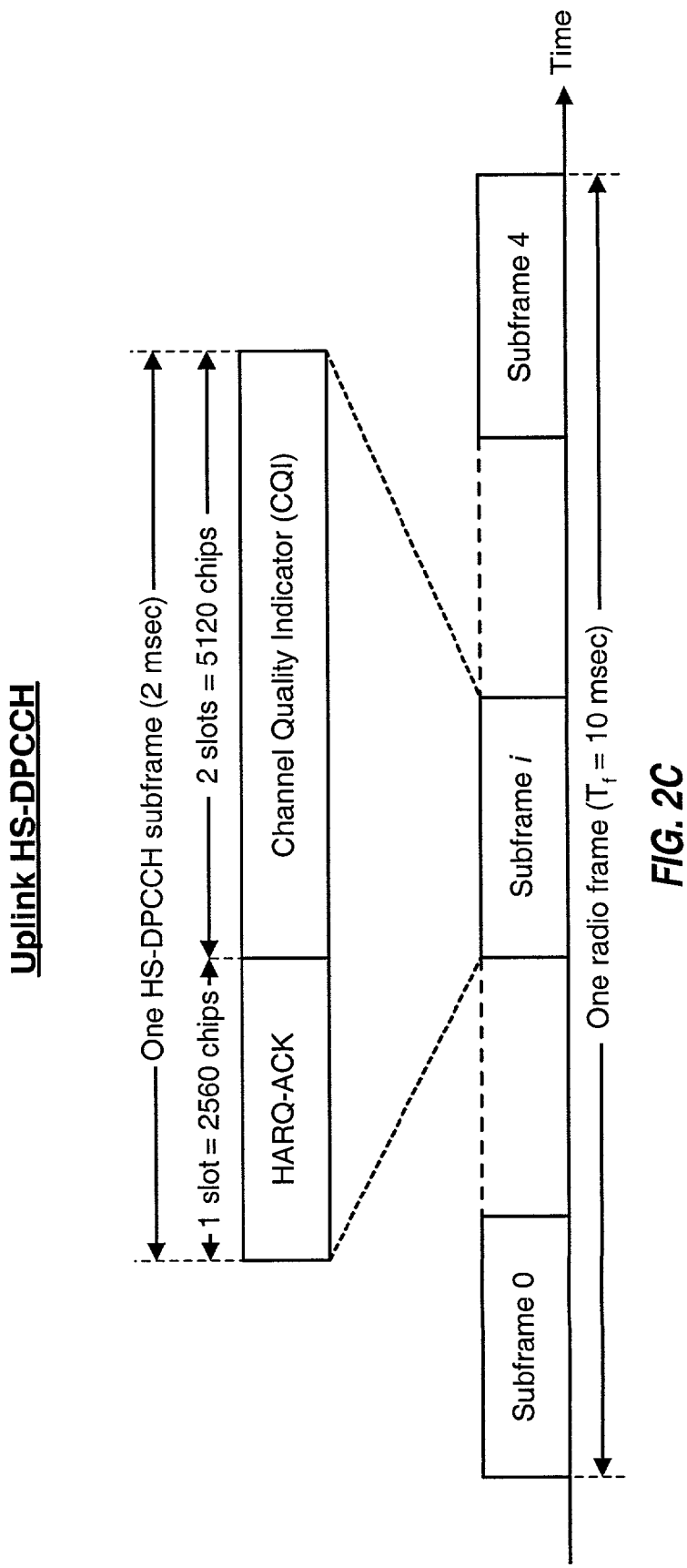

FIG. 2C is a diagram illustrating a frame structure for the uplink HS-DPCCH as defined by W-CDMA. The uplink HS-DPCCH is a physical channel used to carry uplink feedback information related to the downlink transmission on the HS-PDSCH.

As shown in FIG. 2C, the transmission timeline for the HS-DPCCH is divided into frames, with each frame including five subframes and having a duration of 10 msec. Each subframe includes three slots, with each slot carrying 10 data bits and having a duration of 2560 chips. Each HS-DPCCH subframe includes two fields—(1) a hybrid-ARQ acknowledgment (HARQ-ACK) field that is carried in slot 0 of the subframe and (2) a channel quality indicator (CQI) field that is carried in slots 1 and 2 of the subframe. The HARQ-ACK field includes one bit for the ACK/NAK (which is an On/Off bit). The CQI field includes various parameters that may be used by a scheduler to schedule a downlink transmission on the HS-DSCH to the UE. The parameters for the CQI field may include, for example, the transport block size, coding rate, number of HS-PDSCH channelization codes, modulation, power offsets, block error rate (BLER) threshold, and default power offset between the HS-DSCH and the CPICH.

Figure 2D:
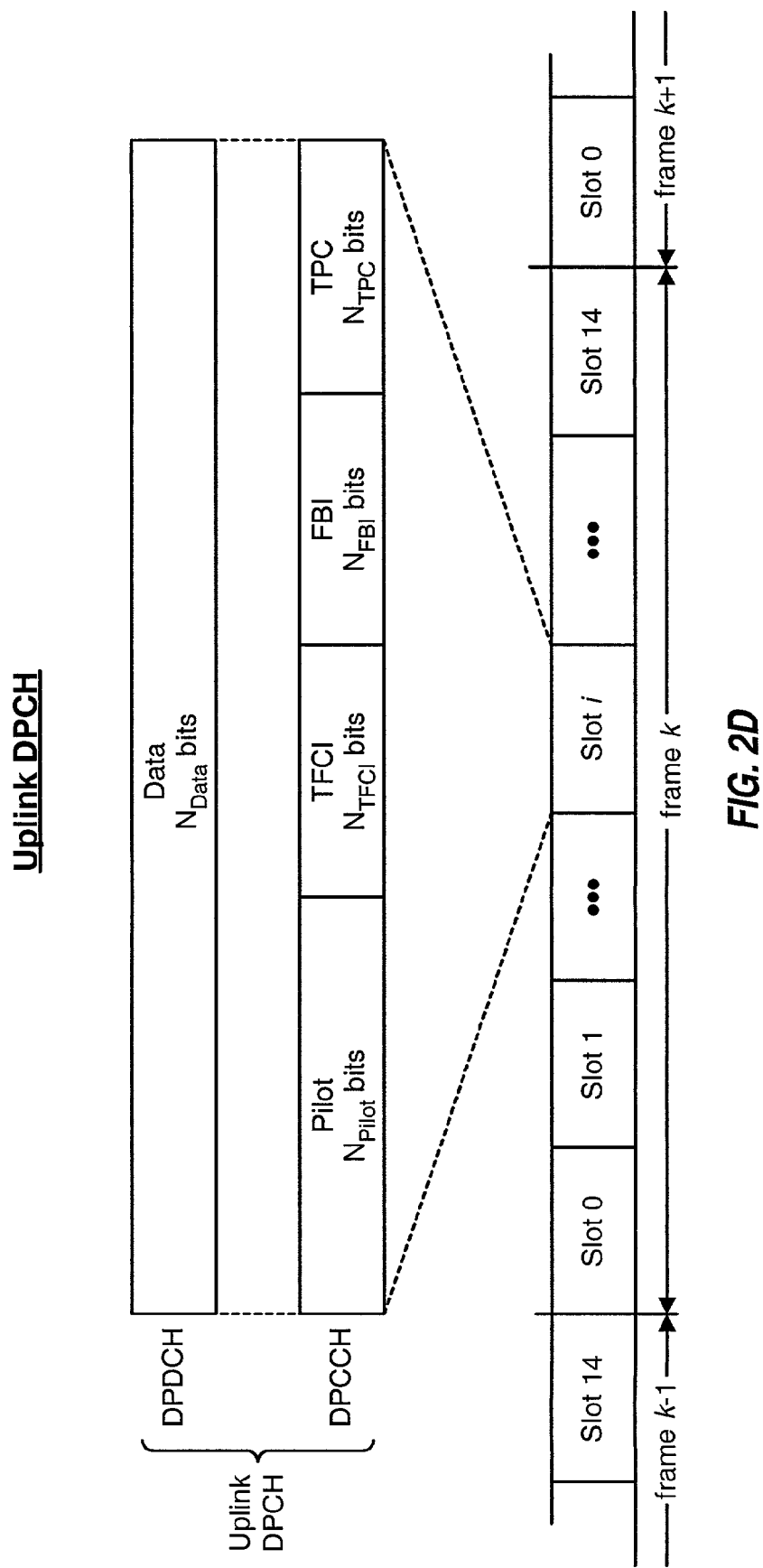

FIG. 2D is a diagram illustrating a frame structure for the uplink DPCH as defined by W-CDMA. The uplink DPCH includes (1) the DPDCH used to carry user-dedicated packet data, and (2) the DPCCH used to carry control data (including power control information for the downlink channels). The transmissions on the DPDCH and DPCCH are partitioned into radio frames, with each radio frame covering 15 slots labeled as slot 0 through slot 14.

For the DPCCH, each slot is further partitioned into a number of fields used to carry different types of control data. As shown in FIG. 2D, DPCCH includes (1) a pilot field used to send a pilot for the dedicated physical channel, (1) a transport format combination indicator (TFCI) field used to send instantaneous parameters (e.g., the bit rate, channelization code, and so on) of the transport channels multiplexed on the uplink DPDCH, (3) a feedback information (FBI) field used to support techniques requiring feedback between the user terminal and base station, such as various transmit diversity modes, and (4) a transmit power control (TPC) field used to send power control information to direct the Node B to adjust its transmit power on the downlink.

Figure 3:
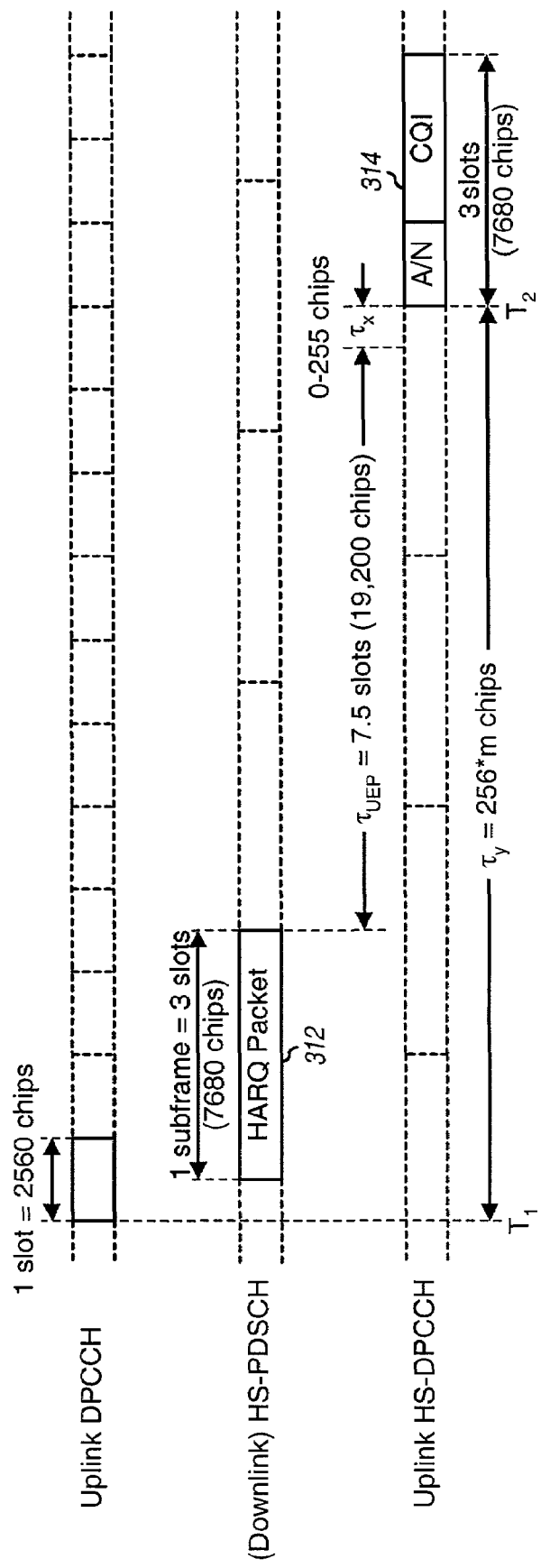
FIG. 3 is a diagram illustrating the timing relationship between various downlink and uplink physical channels used to implement high-speed downlink packet access (HS-DPA)

FIG. 3 is a diagram illustrating the timing relationship between various downlink and uplink physical channels used to implement HSDPA. The timing relationship shown in FIG. 3 is for a specific UE designated to receive HSDPA transmission.

The uplink DPCCH is used by the UE to send signaling for the uplink DPCH. The timing of the uplink DPCCH is used as a reference, and the timing for the other physical channels is provided relative to that of the uplink DPCCH.

As shown in FIG. 3, an HARQ packet is transmitted to the UE in subframe 312 on the HS-DPSCH. The start of subframe 312 occurs some amount of time after time $T_1$, which is the start of a slot on the uplink DPCCH. The HARQ packet is transmitted to the designated UE, which receives and attempts to recover the packet. Based on the outcome of the decoding process, the UE reports back one of the following: (1) an acknowledgment (ACK) to indicate that the packet has been received correctly, (2) a negative acknowledgment (NAK) to indicate that the packet has been received in error (i.e., erased), or (3) transmits nothing (or a DTX bit) if it failed to detect (missed) the corresponding HS-SCCH. This feedback information is transmitted from the UE in a designated subframe 314 on the uplink HS-DPCCH. Subframe 314 starts at time $T_2$, which is a particular amount of time from the end of the corresponding subframe 312. The delay between the end of subframe 312 and the start of subframe 314 is defined to be 7.5 slots plus a delay of $\tau_x$, which is a value between 0 to 255 chips. The delay $\tau_x$ is defined such that the elapsed time, $\tau_y$, between the start of the slot on the uplink DPCCH ($T_1$) and the start of subframe 314 on the uplink HS-DPCCH ($T_2$) is 256·m, where m is an integer.

Referring back to FIG. 1, for HSDPA, the UE may be in soft handover (SHO) with multiple Node Bs on the uplink for the DPCH. Soft handover is a process whereby multiple transmissions are received and processed to increase the reliability of a data transmission. For the downlink, data is transmitted from multiple Node Bs to the UE, which can either (1) combine the symbols for multiple received transmissions and decode the combined symbols, or (2) independently decode the symbols for multiple received transmissions and select the best decoded result. For the uplink, the data transmission from the UE is received by multiple Node Bs and processed to provide the decoded result. For the uplink, each Node B typically independently decodes the symbols for its received transmission and provides the decoded result to the RNC for combining/selection.

HSDPA does not support soft handover with multiple Node Bs on the downlink for the HS-DSCH. For HSDPA, only one Node B in the UE's active set is designated as the serving Node B for HSDPA (or simply, the serving Node B). The active set includes a list of Node Bs with which the UE currently communicates. Since soft handover is not supported for HSDPA, the UE receives an HSDPA transmission from only the serving Node B, as shown in FIG. 1. The other Node Bs in the UE's active set are typically not even aware of the HSDPA transmission by the serving Node B. The feedback information reported on the uplink HS-DPCCH by the UE for the HSDPA transmission is thus directed to the serving Node B, and not the other Node Bs.

As used herein, link imbalance is a phenomenon whereby the serving Node B is not the one with the best uplink for the UE. This phenomenon may occur for a number of reasons. A common reason for the serving Node B not having the best uplink is because of handoff delays. The RNC evaluates the received downlink SNR of all Node Bs in the UE's active set and then send a handoff direction message to the UE. This process may involve large delays. Another reason is that a true physical imbalance may exist wherein the uplink corresponding to HSDPA downlink, becomes weaker than another uplink.

When the serving Node B is different from the Node B to which the UE has the best uplink, a scenario is created whereby the uplink to the serving Node B may no longer be reliable. Link imbalance may have a detrimental impact on performance for HSDPA transmission because the feedback information from the UE may not be reliably received by the serving Node B. The impact to performance resulting from link imbalance is described below.

As shown in FIG. 1, an HSDPA-capable UE is in uplink soft handover between two Node Bs, B1 and B2. The uplink DPDCH (i.e., the data portion of the uplink DPCH) is received by both Node Bs. Each Node B independently processes the received uplink DPDCH and provides decoded results to the RNC. The RNC receives and combines the decoded results from both Node Bs, determines the block error rate (BLER) of the uplink transmission on the DPCH, and provides a setpoint to both Node Bs. The setpoint is a particular target received signal quality deemed to be needed to achieve a particular target BLER. The setpoint may be quantified by a particular signal-to-noise-and-interference ratio (SNR) or some other measurement. The setpoint is adjusted higher if the actual BLER is higher than the target BLER, and is adjusted lower if the actual BLER is lower than the target BLER. The mechanism that adjusts the setpoint based on BLER is often referred to as an outer power control loop.

The setpoint is used by each Node B to adjust the uplink transmit power of the UE. In particular, if the received SNR at a particular Node B is lower than the setpoint, then an UP command may be transmitted to the UE to request an increase in transmit power. Conversely, if the received SNR is greater than the setpoint, then a DOWN command may be transmitted to the UE to request a decrease in transmit power. The UE receives the commands from all Node Bs and implements an "OR-of-the-Down" rule whereby it reduces the uplink transmit power if any Node B requests a decrease. The mechanism that adjusts the transmit power of the UE based on the received SNR is often referred to as an inner power control loop.

For this example, the serving Node B is B1 but the uplink is better from the UE to the second Node B2. The RNC maintains the same uplink setpoint for the outer loop for both Node Bs, as long as the target BLER target for the DPDCH is met. Each Node B in the UE's active set determines the received SNR of the uplink transmission from the UE. This uplink received SNR may be estimated based on a pilot transmitted by the UE (i.e., a pilot transmitted in the pilot field in the uplink DPCCH, which is shown in FIG. 2D). Since the uplink to Node B2 is better than the uplink to Node B1, the received SNR for the uplink transmission received at Node B1 would be lower than the setpoint, and the received SNR at Node B2 would be greater than the setpoint. Node B1 would then send an UP command to request the UE to increase its uplink transmit power, while Node B2 would send a DOWN command to request the UE to decrease its transmit power. If the UE implements the OR-of-the-DOWN rule, then it would reduce the uplink transmit power because of the DOWN command received from Node B2.

For HSDPA, the UE also transmits the uplink HS-DPCCH, which contains (1) ACK/NAK signaling messages for HARQ for the HSDPA transmission on the HS-DPSCH and (2) channel quality indicator (CQI) signaling used by the scheduler to schedule the HSDPA transmission to the UE. Since the HS-DPSCH is only transmitted from the serving Node B1 and soft handover is not supported for this physical channel, the feedback information on the associated uplink HS-DPCCH is intended only for the serving Node B1. However, due to a lower received SNR for the uplink at the serving Node B1, the reliability of the uplink HS-DPCCH may be reduced noticeably or drastically. In particular, the reliability of the uplink HS-DPCCH worsens with the increasing link imbalance between the two Node Bs.

Techniques are provided herein to mitigate the effects of link imbalance between the Node Bs, when such a condition exists. In one aspect, the serving Node B monitors the uplink received SNR for each UE designated to receive HSDPA transmission. The serving Node B then determines, based on the uplink received SNR and an SNR threshold, whether or not link imbalance potentially exists for each such UE. In another aspect, if the possibility of link imbalance is detected, then a 3-way handshake in the HARQ process is performed to check the reliability of the feedback mechanism for the HSDPA transmission. Appropriate responsive actions may then be performed based on the result of the check. These aspects are described in further detail below.

For reliable HSDPA transmission, the requirements for the ACK/NAK transmission from the UE on the uplink HS-DPCCH are specified as follows:

Probability $\{ACK \rightarrow NAK\} \leq 10^{-2}$

Probability $\{NAK \rightarrow ACK\} \leq 10^{-4}$

Probability $\{DTX \rightarrow ACK\} \leq 10^{-2}$

The above states that (1) the probability of an ACK transmitted by the UE being received as a NAK by the Node B needs to be less than or equal to $10^{-2}$, (2) the probability of a NAK transmitted by the UE being received as an ACK by the Node B needs to be less than or equal to $10^{-4}$, and (3) the probability of a discontinuous transmission (DTX) bit transmitted by the UE being received as an ACK by the Node B needs to be less than or equal to $10^{-2}$.

If a transmitted ACK is erroneously received as a NAK, then data correctly decoded at the UE may be retransmitted unnecessarily by the Node B. This would reduce system capacity but does not detrimentally impact the performance of the UE. However, if a transmitted NAK is erroneously received as an ACK, then data erroneously decoded at the UE will not be retransmitted by the Node B. This may then severely impact the performance of the UE and the system. Thus, NAKs are transmitted on the uplink by the UE in a manner such that higher reliability is achieved. However, in the presence of link imbalance, even with repetition and/or a higher NAK/pilot ratio, the specified {NAK→ACK} error target of $10^{-4}$ or better may not be achieved.

Figure 4:
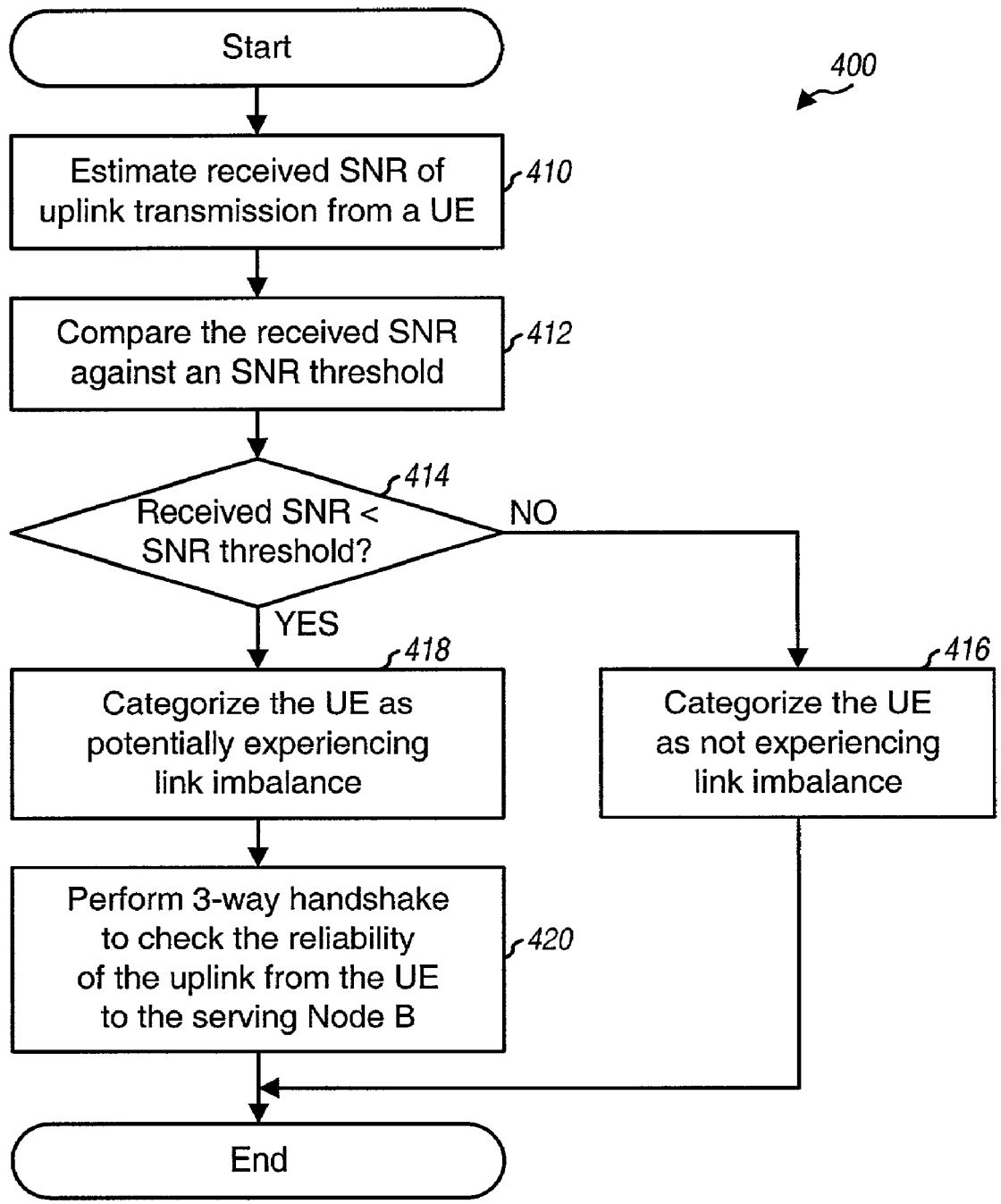
FIG. 4 is a flow diagram of a process performed by a serving Node B to monitor the uplink received SNRs for the UEs to detect for link imbalance.

FIG. 4 is a flow diagram of an embodiment of a process 400 performed by the serving Node B to monitor the uplink received SNRs for the UEs to detect for link imbalance. Process 400 may be performed for each UE designated to receive HSDPA transmission.

Initially, the serving Node B estimates the received SNR of an uplink transmission (e.g., a pilot included in the uplink DPCCH) from the UE (step 410). The serving Node B then compares the uplink received SNR of the UE against a particular SNR threshold (step 412). This SNR threshold is selected to provide good detection of link imbalance, and may be determined based on computer simulation, empirical measurements, some other means, or a combination thereof. As a specific example, the SNR threshold may be set at −21 dB.

A determination is then made whether or not the uplink received SNR for the UE is less than the SNR threshold (step 414). If the outcome of the comparison is NO, then the UE is categorized as one not experiencing link imbalance (step 416), and the process terminates. Otherwise, if the received SNR is less than the SNR threshold, then the UE is categorized as one potentially experiencing link imbalance (step 418). A 3-way handshake is then performed to check the reliability of the uplink feedback from the UE to the serving Node B (step 420). The 3-way handshake is described in further detail below. Appropriate responsive actions may then be performed based on the outcome of the 3-way handshake. The process then terminates.

In FIG. 4, steps 410 through 414 determine whether or not the UE is potentially experiencing link imbalance. Steps 416 through 420 are the initial steps performed to mitigate the deleterious effects of link imbalance (the other mitigating steps are not shown in FIG. 4 for simplicity).

Figure 5:
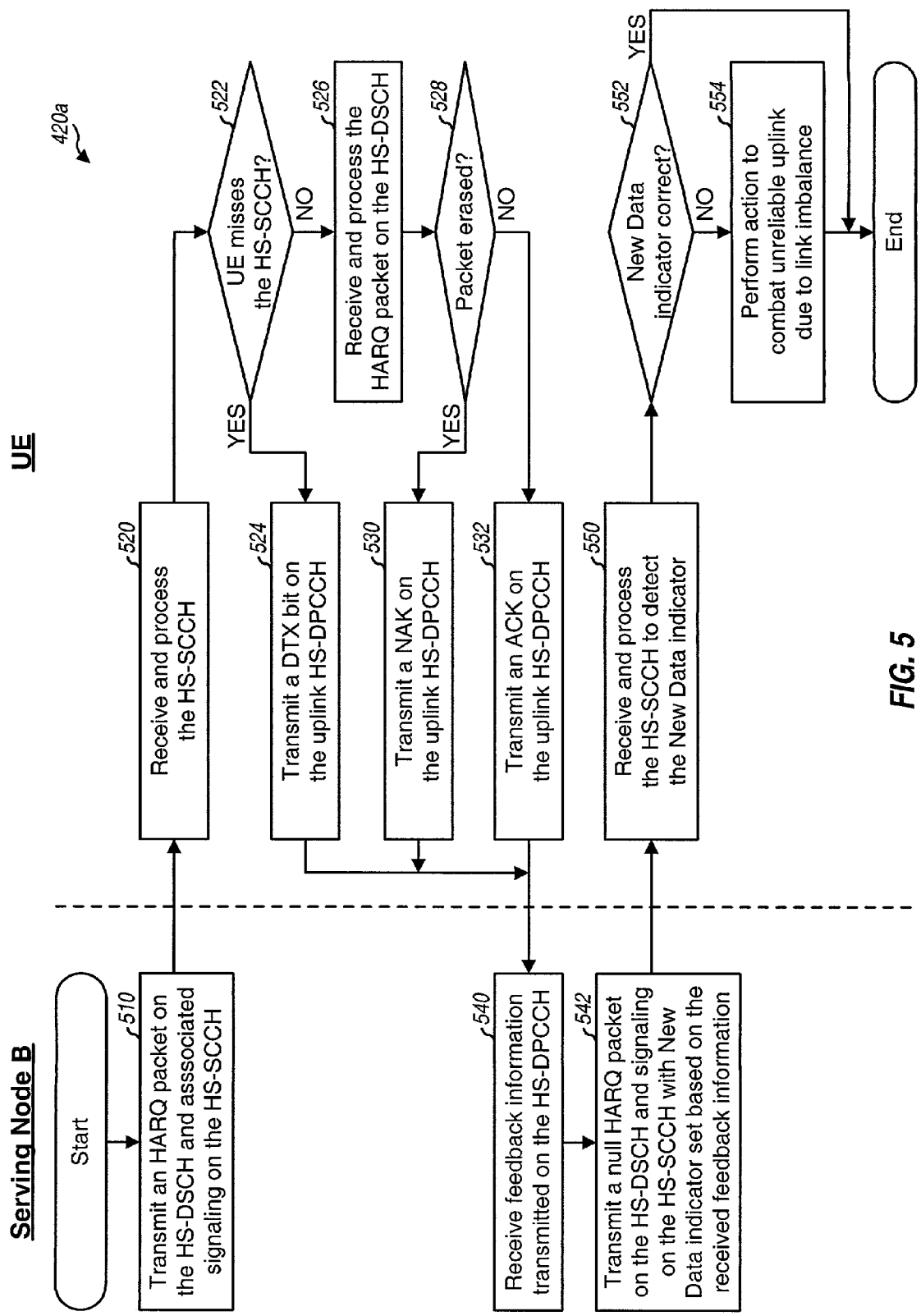
FIG. 5 is a flow diagram of an embodiment of a process for performing a 3-way handshake between the serving Node B and the UE to check the reliability of the uplink.

FIG. 5 is a flow diagram of an embodiment of a process 420a for performing the 3-way handshake between the serving Node B and the UE to check the reliability of the uplink. Process 420a is one embodiment of, and may be used for, step 420 in FIG. 4. In an embodiment, to reduce the amount of overhead signaling, process 420a is only performed after it has been detected that the UE may be experiencing link imbalance.

For the 3-way handshake, the serving Node-B initially transmits an HARQ packet on the HS-DSCH and associated signaling on the HS-SCCH (step 510). The HARQ packet is a packet that includes data for a designated UE. The data to be included in the HARQ packet is dependent on various factors such as, for example (1) whether or not the serving Node B has any data to transmit to the UE, (2) whether an ACK or a NAK, if any, was received by the serving Node B, (3) whether or not link imbalance has been detected for the UE, and so on. Thus, the HARQ packet may comprise a new data packet, a prior-transmitted data packet, a partial packet of a prior-transmitted data packet, or some other type of packet.

The associated signaling in the HS-SCCH includes the information enumerated above, which includes (1) a UE ID used to identify the specific UE for which the packet is intended and (2) various parameters descriptive of the data transmission on the associated HS-DSCH. For example, the parameters may identify the channelization codes, transport block size, priority queue, and so on. The parameters sent on the HS-SCCH are used by the UE to receive the HARQ packet sent on the HS-DSCH and may further be used to perform some other actions related to the received HARQ packet.

The UE receives and processes the HS-SCCH to determine whether or not it should recover the packet on the associated HS-DSCH (step 520). A determination is then made whether or not the UE misses the HS-SCCH (step 522). The UE misses the HS-SCCH if it fails to detect that the HARQ packet on the HS-DSCH is intended for it. This may be the case, for example, if the UE incorrectly decodes the UE ID in the HS-SCCH. If the UE misses the HS-SCCH, then it does not transmit anything (DTX) on the uplink HS-DPCCH for the packet (step 524). The DTX merely indicates that the uplink transmission should be turned off, and is not actually transmitted by the UE.

Otherwise, if the UE properly receives the HS-SCCH and determines from the decoded signaling on the HS-SCCH that an HARQ packet is transmitted for it on the HS-DSCH, then the UE processes the HS-DSCH to recover the packet (step 526). A determination is then made whether or not the packet has been received in error (i.e., erased) or correctly (step 528). If the packet was received in error, then a NAK is transmitted on the uplink HS-DPCCH as feedback for the packet (step 530). Otherwise, if the packet was received correctly, then an ACK is transmitted on the uplink HS-DPCCH (step 532).

In any case, for the HARQ packet transmitted on the HS-DSCH, the serving Node B expects feedback information from the UE. The serving Node B then receives and processes the uplink HS-DPCCH to recover the feedback information (which may be a DTX bit, a NAK, or an ACK) sent by the UE for the packet (step 540).

In an embodiment, the serving Node B transmits another (second) HARQ packet on the HS-DSCH and the associated signaling on the HS-SCCH (step 542). If no data is scheduled for transmission to the UE, then the serving Node B transmits a null or dummy HARQ packet as the second HARQ packet. The null HARQ packet is simply a packet with no payload. The associated signaling on the HS-SCCH has the New Data indicator set to a proper value. In an embodiment, the New Data indicator is set to one ("1") if the serving Node B decodes an ACK for the feedback information from the UE, and is set to zero ("0") otherwise. The second HARQ packet transmission may thus be effectively a transmission of just the associated HS-SCCH in the next transmission with the value for the New Data indicator set properly.

The UE receives and processes the HS-SCCH to detect the New Data indicator transmitted by the serving Node B for the UE (step 550). The UE then compares the detected indicator against an expected value to determine whether or not the New Data indicator was set properly by the serving Node B (step 552). Table 1 lists the possible results from the comparison between the detected indicator and the expected value.

TABLE 1

| Detected New Data Indicator | Feedback Transmitted by the UE | | |
|---|---|---|---|
| | DTX | ACK | NAK |
| Zero ("0") | OK | Error[3] | OK |
| One ("1") | Error[1] | OK | Error[2] |

As shown in Table 1, if a DTX bit or a NAK was sent by the UE and a zero was received for the New Data indicator, of if an ACK bit was transmitted by the UE and a one was received for New Data indicator, then it is assumed that the feedback information from the UE was corrected received by the serving Node B and also correctly sent to the UE. In this case, the 3-way handshake for the first HARQ packet terminates.

However, if the UE sent a DTX bit or a NAK in the previous uplink HS-DPCCH transmission, and subsequently receives a one ("1") for the New Data indicator in the HS-SCCH (which would have been sent by the serving Node B only if it had received an ACK), then one of three things may be implied:

1. An HARQ packet had been sent earlier on the HS-DSCH and the UE missed the associated HS-SCCH, thereby sending a DTX bit on the uplink HS-DPCCH (step 524 in FIG. 5). This DTX bit was erroneously received as an ACK by the serving Node B, which then sent a one ("1") for the New Data indicator on the HS-SCCH. (This corresponds to superscript 1 in Table 1.)

2. The UE decoded the previous HARQ packet incorrectly as an erasure and sent a NAK on the uplink HS-DPCCH. This NAK was erroneously received as an ACK by the serving Node B, which then sent a one ("1") for the New Data indicator on the HS-SCCH. (This corresponds to superscript 2 in Table 1.)

3. The UE was not scheduled earlier and has been sending DTX on the uplink. The UE is then scheduled, and the serving Node B sends data with the New Data indicator set to one ("1") in the HSS-SCCH. There is no problem associated with this case.

For case 2, the UE realizes that the serving Node B has erroneously detected the feedback information from the UE and is not going to retransmit the HARQ packet not present at the UE. Even for case 1, if the HS-SCCH indicates a dummy payload, then the UE recognizes that it missed a previous control channel and the Node B has erred in interpreting the uplink HS-DPCCH. The UE may then perform action(s) to deal with the unreliable uplink due to link imbalance. For example, the UE may flush its re-ordering buffer to the upper layer (the Radio Link Control (RLC) layer) with the anticipation that the upper layer will catch the erroneous data transmission and will trigger a retransmission at the upper layer.

Alternatively, if the UE sent an ACK in the previous uplink HS-DPCCH transmission, and subsequently receives a zero ("0") for the New Data indicator on the HS-SCCH (which would have been sent by the serving Node B only if it had received anything other than an ACK), then the following may be implied:

1. The UE decoded the previous HARQ packet correctly and sent an ACK on the uplink HS-DPCCH. This ACK was erroneously received by the serving Node B, which then sent a zero ("0") for the New Data indicator on the HS-SCCH. (This corresponds to superscript 3 in Table 1.)

The error described above is not a catastrophic event in terms of performance since it simply results in a retransmission by the serving Node B of a packet already decoded correctly by the UE. The UE may simply ignore this retransmission.

The 3-way handshake is thus a mechanism for the UE to check whether or not its uplink transmission was decoded correctly by the serving Node B. This mechanism may be implemented by using some amount of overhead signaling and additional transmit power for a HS-SCCH transmission of the null HARQ packet. The amount of signaling and transmit power used for checking the uplink reliability may be minimized by performing the 3-way handshake only when link imbalance is suspected.

The 3-way handshake may be used to improve performance for HSDPA. With the ability to detect an unreliable link (e.g., instead of having to rely on some other mechanism at the upper layer), appropriate responsive action may be performed at an earlier stage. Without the ability to detect an unreliable link, the UE may send a NAK for a retransmission of an erased frame, which may be erroneously received as an ACK. The UE may then be waiting for the retransmission of this erased packet for an extended period of time, for example, until the expiration of a timer (which may be maintained by the upper layer).

Figure 6:
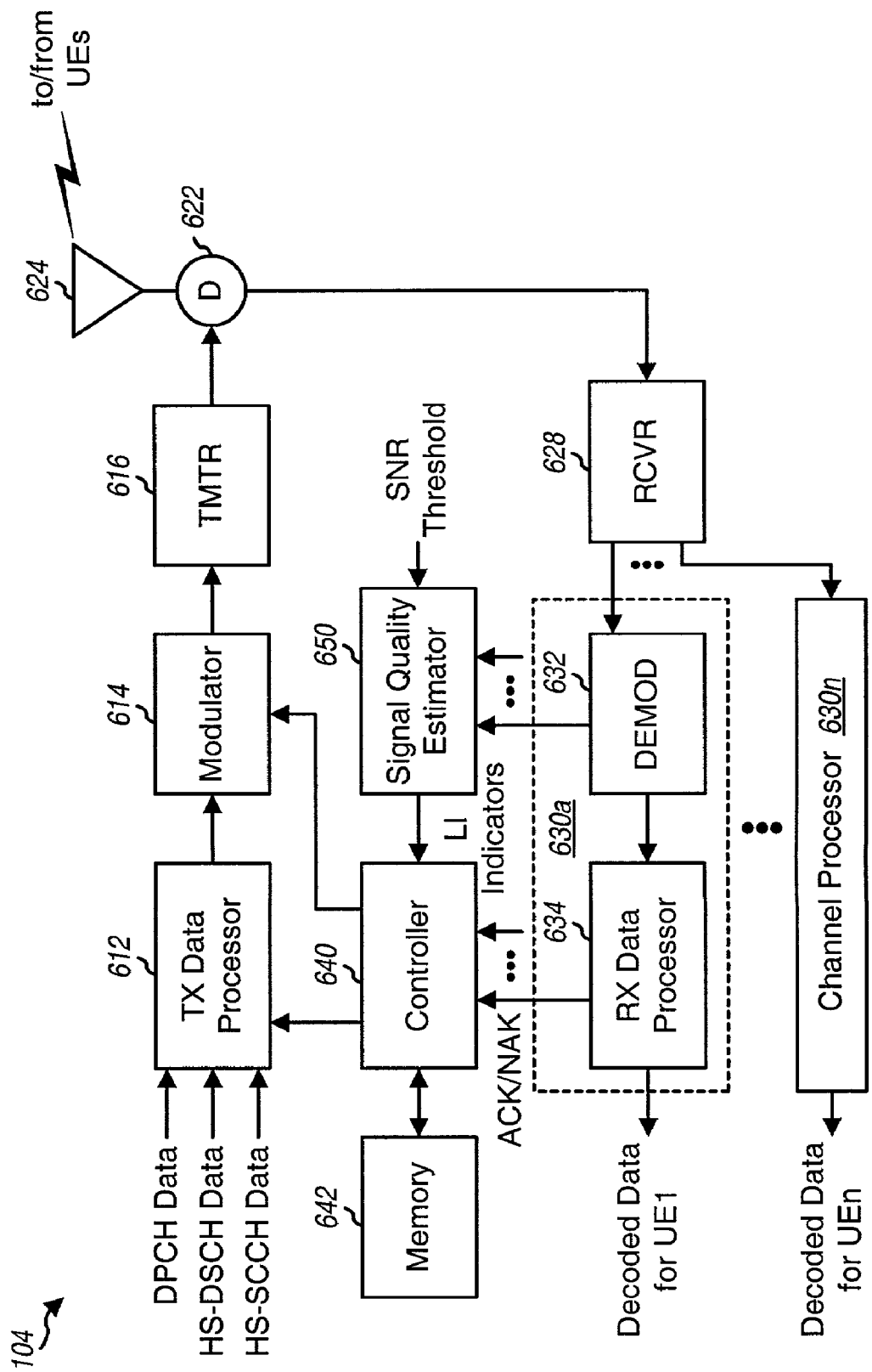
FIG. 6 is a block diagram of an embodiment of a Node B.

FIG. 6 is a block diagram of an embodiment of Node B 104. On the downlink, data for the downlink DPCH, HS-DSCH, and HS-SCCH for each UE designated to receive HSDPA transmission is received and processed (e.g., formatted, encoded, and so on) by a transmit (TX) data processor 612. The processing for each channel is determined by the set of parameters associated with that channel, and may be performed as described by the W-CDMA standard documents. The processed data is then provided to a modulator (MOD) 614 and further processed (e.g., channelized, scrambled, and so on) to provide modulated data. A transmitter (TMTR) unit 616 then converts the modulated data into one or more analog signals, which are further conditioned (e.g., amplified, filtered, and frequency unconverted) to provide a downlink signal. The down link signal is routed through a duplexer (D) 622 and transmitted via an antenna 624 to the designated UE(s).

Figure 7:
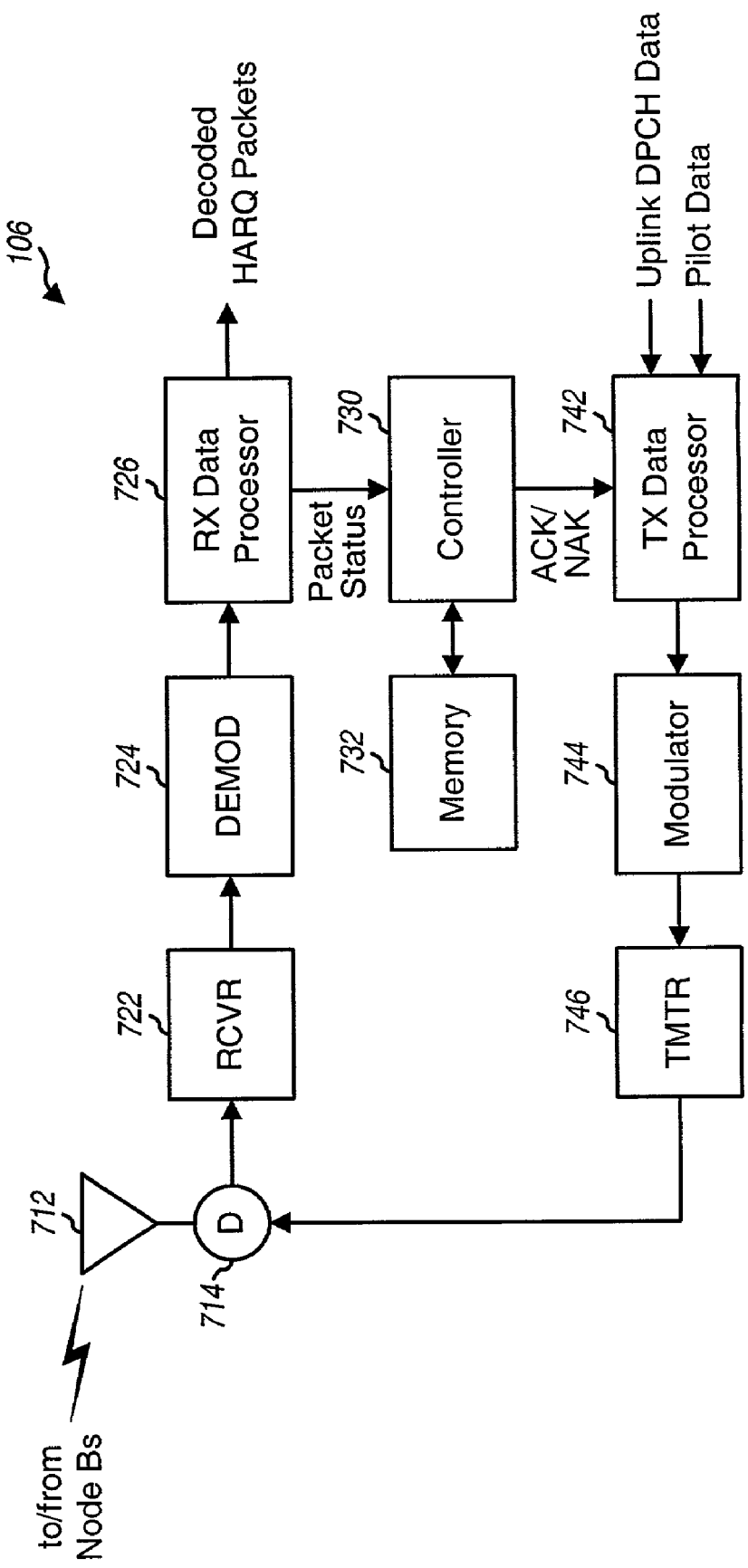
FIG. 7 is a block diagram of an embodiment of a UE.

FIG. 7 is a block diagram of an embodiment of UE 106. The downlink signal is received by an antenna 712, routed through a duplexer 714, and provided to a receiver (RCVR) unit 722. Receiver unit 722 conditions (e.g., filters, amplifies, and frequency downconverts) the received signal and further digitizes the conditioned signal to provide samples. A demodulator 724 then receives and processes (e.g., descrambles, channelizes, and data demodulates) the samples to provide symbols. Demodulator 724 may implement a rake receiver that can process multiple instances (or multipath components) of the received signal and provide combined symbols. A receive (RX) data processor 726 then decodes the symbols, checks the received packets, and provides the decoded packets. The processing by demodulator 724 and RX data processor 726 is complementary to the processing by modulator 614 and TX data processor 612, respectively.

For HSDPA transmission, RX data processor 726 further provides the status of each received HARQ packet (i.e., received correctly or erased) to a controller 730. For each received HARQ packet, controller 730 provides either an ACK if the packet was decoded correctly or a NAK if the packet was decoded in error.

On the uplink, data for the uplink DPCH, pilot data, and feedback information are processed (e.g., formatted, encoded, and so on) by a transmit (TX) data processor 742, further processed (e.g., channelized, scrambled, and so on) by a modulator (MOD) 744, and conditioned (e.g., converted to analog signals, amplified, filtered, and frequency upconverted) by a transmitter unit 746 to provide an uplink signal. The data processing for the uplink is described by the W-CDMA standard documents. The uplink signal is routed through duplexer 714 and transmitted via antenna 712 to one or more Node Bs 104.

Referring back to FIG. 6, at Node B 104, the uplink signal is received by antenna 624, routed through duplexer 622, and provided to a receiver unit 628. Receiver unit 628 conditions (e.g., frequency downconverts, filters, and amplifies) the received signal and further digitizes the conditioned signal to provide a stream of samples.

In the embodiment shown in FIG. 6, node B 104 includes a number of channel processors 630a through 630n. Each channel processor 630 may be assigned to process the sample steam for one UE to recover the data and feedback information transmitted on the uplink by the assigned UE. Each channel processor 630 includes a (1) demodulator 632 that processes (e.g., descrambles, channelizes, and so on) the samples to provide symbols, and (2) a RX data processor 634 that further processes the symbols to provide the decoded data for the assigned UE.

In an embodiment, the pilot symbols received from the UEs are provided by demodulator 632 to a signal quality estimator 650, which estimates the SNR of the transmissions on the uplink DPCH. The SNR for a given channel can be estimated using various techniques, such as those described in U.S Pat. Nos. 6,097,972, 5,903,554, 5,056,109, and 5,265,119.

For each UE designated to receive HSDPA transmission, the received SNR for the uplink DPCH is compared against the SNR threshold. The same SNR threshold may be used for all UEs, or different SNR thresholds may be used for each UE. For each UE, signal quality estimator 650 compares the received SNR to the SNR threshold and provides a link imbalance (LI) indicator, which may be determined as described in FIG. 4. The LI indicator is used to note whether or not the UE has been categorized as one potentially experiencing link imbalance.

Controller 640 receives the LI indicator for each UE receiving HSDPA transmission and determines whether or not to perform the 3-way handshake. Controller 640 also receives the ACK/NAK detected by RX data processor 634. If 3-way handshake is to be performed, then controller 640 directs the transmission of another HARQ packet on the HS-DSCH and the associated signaling on the HS-SCCH to the UE. The content of the HARQ packet is dependent on various factors, as described above, and the signaling on the HS-SCCH has the New Data indicator set based on the detected ACK/NAK.

Controllers 640 and 730 control the processing at the Node B and the UE, respectively. Each controller may also be designed to implement all or a portion of the process to mitigate link imbalance. Program codes and data required by controllers 640 and 730 may be stored in memory units 642 and 732, respectively.

For simplicity, specific implementation details have been described for the mitigation of link imbalance. In particular, the determination of whether or not a UE is potentially experiencing link imbalance is based on the uplink received SNR and the SNR threshold. This determination may also be made using other criterion, and this is within the scope of the invention. For example, this determination may also be made based on (1) the received power of the uplink pilot (Ec), (2) the BLER for the uplink DPCH, and so on.

Also for simplicity, a specific 3-way handshake scheme was described to check the reliability of the uplink when it is determined that link imbalance may exist for a given UE. Other schemes to check the reliability of the uplink may also be implemented, and this is within the scope of the invention. For example, any of the information received on the uplink HS-DPCCH may be resent on the downlink (e.g., on the HS-DSCH) to the UE.

Although the techniques for mitigating deleterious effects due to link imbalance have been specifically described for the uplink, these techniques may also be applied for the downlink. These techniques may also be used for other CDMA systems (e.g., IS-2000) and other types of communication systems (e.g., TDMA and FDMA systems).

The techniques for mitigating the deleterious effects of link imbalance described herein may be implemented by various means. For example, these techniques may be implemented in hardware, software, or a combination thereof. For a hardware implementation, the elements used to implement any one or a combination of the techniques (e.g., the elements that implement the processes shown in FIGS. 4 and 5 at the Node B and the UE) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, these techniques may be implemented with modules (e.g., procedures, functions, and so on) that perform the functions described herein. The software codes may be stored in a memory unit (e.g., memory units 642 and 732 in FIGS. 6 and 7, respectively) and executed by a processor (e.g., controllers 640 and 730). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for checking the reliability of a communication link in a wireless communication system, comprising:

sending a first transmission over a first communication link;

receiving feedback information in a second transmission sent over a second communication link, wherein the feedback information relates to the first transmission; and sending a third transmission over the first communication link, wherein the third transmission includes data indicative of the received feedback information, and wherein the reliability of the second communication link is checked based on the data in the third transmission and the feedback information.

2. The method of claim 1, wherein the first communication link is a downlink and the second communication link is an uplink in the wireless communication system.

3. The method of claim 2, wherein the wireless communication system is a W-CDMA system.

4. The method of claim 3, wherein the first transmission is for high-speed downlink packet access (HSDPA).

5. The method of claim 3, wherein the first transmission comprises a data packet sent on a high-speed downlink shared channel (HS-DSCH).

6. The method of claim 3, wherein the feedback information is received via an uplink high-speed dedicated physical control channel (HS-DPCCH).

7. The method of claim 3, wherein the third transmission is sent via a shared control physical channel (HS-SCCH).

8. The method of claim 7, wherein for the third transmission an indicator in the HS-SCCH is set to a value determined based on the received feedback information.

9. The method of claim 1, wherein the feedback information comprises an acknowledgment (ACK), a negative acknowledgment (NAK), or a discontinuous transmission (DTX) bit for the first transmission.

10. The method of claim 1, wherein the first transmission is sent from a single base station to a particular terminal.

11. The method of claim 10, wherein the particular terminal is in soft handover with a plurality of base stations, one of which is the base station that sent the first transmission.

12. A method for determining the reliability of an uplink in a wireless communication system, comprising:
receiving a first transmission on a downlink;
sending feedback information in a second transmission on the uplink, wherein the feedback information relates to the first transmission;
receiving a third transmission on the downlink, wherein the third transmission comprises data related to the sent feedback information; and
determining the reliability of the uplink based on the data received in the third transmission and the feedback information.

13. The method of claim 12, wherein the uplink is deemed to be unreliable if the data received in the third transmission does not correspond to the feedback information sent in the second transmission.

14. The method of claim 12, further comprising:
signaling for a retransmission of the first transmission if the uplink is determined to be unreliable.

15. The method of claim 12, wherein the feedback information comprises an acknowledgment (ACK), a negative acknowledgment (NAK), or a discontinuous transmission (DTX) bit for the first transmission.

16. A method for checking the reliability of a communication link in a wireless communication system, comprising:
determining whether or not link imbalance potentially exists for a first communication link between a particular transmitter unit and a plurality of receiver units, wherein link imbalance is characterized by the first communication link being worse from the transmitter unit to a first receiver unit than to a second receiver unit among the plurality of receiver units, wherein the first receiver unit is designated to transmit data to the transmitter unit on a second communication link and the second receiver unit is not designated to transmit data to the transmitter unit; and
sending a second transmission via the second communication link if it is determined that link imbalance potentially exists, wherein the second transmission includes data related to feedback information previously received in a first transmission on the first communication link.

17. The method of claim 16, wherein the determining includes
estimating a signal quality of a transmission received via the first communication link, and wherein the link imbalance is determined to potentially exist if the estimated signal quality is lower than a threshold value.

18. The method of claim 17, wherein the estimated signal quality corresponds to a signal-to-noise-and-interference ratio (SNR) of a pilot received via the first communication link.

19. The method of claim 16, wherein the second transmission is used to determine whether or not the feedback information in the first transmission was correctly received.

20. The method of claim 16, wherein the feedback information comprises an acknowledgment (ACK) or a negative acknowledgment (NAK) for a third transmission on the second communication link, wherein the third transmission occurred prior to the first transmission.

21. The method of claim 20, wherein the data in the second transmission comprises a bit on a shared control channel that is set based on whether an ACK or a NAK was received.

22. The method of claim 16, wherein the first communication link is an uplink and the second communication link is a downlink in the communication system.

23. The method of claim 22, wherein the wireless communication system is a W-CDMA system.

24. A method for checking the reliability of an uplink in a CDMA communication system, comprising:
determining whether or not link imbalance potentially exists for the uplink between a particular user equipment (UE) and a plurality of base stations (Node Bs), wherein the link imbalance is characterized by the uplink being worse from the UE to a first Node B designated to transmit data to the UE on a downlink than to a second Node B not designated to transmit data to the UE; and
sending a second transmission via the downlink if link imbalance is determined to potentially exist, wherein the second transmission includes data related to feedback information previously received in a first transmission on the uplink.

25. The method of claim 24, wherein the determining includes
estimating a received signal-to-noise-and-interference ratio (SNR) of a pilot received via the uplink, and wherein the link imbalance is determined to potentially exist if the received SNR is lower than an SNR threshold.

26. The method of claim 24, wherein the feedback information comprises an acknowledgment (ACK), a negative acknowledgment (NAK), or a discontinuous transmission (DTX) bit.

27. The method of claim 24, wherein the feedback information is for a data transmission on a high-speed downlink shared channel (HS-DSCH).

28. The method of claim 24, wherein the feedback information is received via an uplink high-speed dedicated physical control channel (HS-DPCCH).

29. The method of claim 24, wherein the second transmission is sent via a shared control physical channel (HS-SCCH).

30. A memory communicatively coupled to a digital signal processing device (DSPD) capable of interpreting digital information to:
send a first transmission over a first communication link;
receive feedback information in a second transmission sent over a second communication link, wherein the feedback information relates to the first transmission; and
send a third transmission over the first communication link, wherein the third transmission includes data indicative of the received feedback information, and
wherein the reliability of the second communication link is checked based on the data in the third transmission and the feedback information.

31. A memory communicatively coupled to a digital signal processing device (DSPD) capable of interpreting digital information to:
determine whether or not link imbalance potentially exists for a first communication link between a particular transmitter unit and a plurality of receiver units, wherein link imbalance is characterized by the first communication link being worse from the transmitter unit to a first receiver unit than to a second receiver unit among the plurality of receiver units, wherein the first receiver unit is designated to transmit data to the transmitter unit on a second communication link and the second receiver unit is not designated to transmit data to the transmitter unit; and
send a second transmission via the second communication link if it is determined that link imbalance potentially exists, wherein the second transmission includes data related to feedback information previously received in a first transmission on the first communication link.

32. An apparatus in a wireless communication system, comprising:
means for sending a first transmission over a first communication link;
means for receiving feedback information in a second transmission sent over a second communication link, wherein the feedback information relates to the first transmission; and
means for sending, a third transmission over the first communication link, wherein the third transmission includes data indicative of the received feedback information, and
wherein the reliability of the second communication link is checked based on the data in the third transmission and the feedback information.

33. An apparatus in a wireless communication system, comprising:
means for determining whether or not link imbalance potentially exists for a first communication link between a particular transmitter unit and a plurality of receiver units,
wherein link imbalance is characterized by the first communication link being worse from the transmitter unit to a first receiver unit than to a second receiver unit among the plurality of receiver units, wherein the first receiver unit is designated to transmit data to the transmitter unit on a second communication link and the second receiver unit is not designated to transmit data to the transmitter unit; and
means for sending a second transmission via the second communication link if it is determined that link imbalance potentially exists, wherein the second transmission includes data related to feedback information previously received in a first transmission on the first communication link.

34. A base station in a wireless communication system, comprising:
a TX data processor operative send a first transmission over a first communication link; and
a RX data processor. operative to receive feedback information in a second transmission sent over a second communication link, wherein the feedback information relates to the first transmission, and
wherein the TX data processor is further operative to send a third transmission over the first communication link and having included therein data indicative of the received feedback information, and wherein the reliability of the second communication link is checked based on the data in the third transmission and the feedback information.

35. A base station in a wireless communication system, comprising:
a controller operative to determine whether or not link imbalance potentially exists for a first communication link between a particular terminal and a plurality of base stations, wherein link imbalance is characterized by the first communication link being worse from the terminal to a first base station than to a second base station among the plurality of base stations, wherein the first base station is designated to transmit data to the terminal on a second communication link and the second base station is not designated to transmit data to the terminal; and
a TX data processor operative to send the second transmission via a second communication link if it is determined that link imbalance potentially exists, wherein the second transmission includes data related to feedback information previously received in a first transmission on the first communication link.

36. A terminal in a wireless communication system, comprising:
a RX data processor operative to receive a first transmission on a downlink; and
a TX data processor operative to send feedback information in a second transmission on the uplink, wherein the feedback information relates to the first transmission, and wherein the RX data processor is further operative to receive a third transmission on the downlink, wherein the third transmission comprises data related to the sent feedback information; and
a controller operative to determine the reliability of the uplink based on the data received in the third transmission and the feedback information.

* * * * *